US007205014B2

(12) United States Patent
Takebe et al.

(10) Patent No.: US 7,205,014 B2
(45) Date of Patent: Apr. 17, 2007

(54) PRODUCTION METHOD OF SOYMILK CURD

(75) Inventors: Takaaki Takebe, Tokyo (JP); Nozomi Adachi, Kanagawa (JP); Masaki Tamura, Nagano (JP); Yoichi Katagiri, Nagano (JP)

(73) Assignee: Asahimatsu Foods Co., Ltd., Nagano (JP)

( * ) Notice: Subject to any disclaimer, the term of this patent is extended or adjusted under 35 U.S.C. 154(b) by 554 days.

(21) Appl. No.: 10/797,135

(22) Filed: Mar. 11, 2004

(65) Prior Publication Data

US 2004/0180128 A1 Sep. 16, 2004

(30) Foreign Application Priority Data

Mar. 13, 2003 (JP) .............................. 2003-067869

(51) Int. Cl.
*A23L 1/20* (2006.01)
(52) U.S. Cl. ......................................... 426/46; 426/634
(58) Field of Classification Search .................. 426/46, 426/573, 634
See application file for complete search history.

(56) References Cited

U.S. PATENT DOCUMENTS 5,055,310 A * 10/1991 Nonaka et al. ............... 426/46
5,965,176 A * 10/1999 Yamamoto ................... 426/46
6,042,851 A *  3/2000 Matsuura et al. .............. 426/8
6,284,304 B1 *  9/2001 Matsuura et al. ........... 426/634
6,342,256 B1 *  1/2002 Oomura et al. ............... 426/46
6,582,739 B1 *  6/2003 Sawano et al. ............... 426/46

FOREIGN PATENT DOCUMENTS

JP      58-028234      *  2/1983

* cited by examiner

*Primary Examiner*—Keith Hendricks
(74) *Attorney, Agent, or Firm*—Wenderoth, Lind & Ponack, L.L.P.

(57) ABSTRACT

The present invention provides a method for producing a soymilk curd comprising steps of: adding a protein cross-linking enzyme into acid-treated soymilk adjusted at pH 5.4 to 6.4 by adding an acid to the soymilk; allowing proteins in the soymilk to form cross-links by maintaining the temperature at 20 to 60° C.; and allowing the cross-linked and acid-treated soymilk to coagulate by maintaining the temperature at 70 to 90° C. The present invention also provides a method for producing a soymilk curd comprising steps of: adding a protein cross-linking enzyme and sugars into acid-treated soymilk adjusted at pH 5.4 to 6.4 by adding an acid to the soymilk; allowing proteins in the soymilk to form cross-links by maintaining the temperature at 20 to 60° C.; and allowing the cross-linked and acid-treated soymilk to coagulate by maintaining the temperature at 70 to 90° C.

12 Claims, No Drawings

PRODUCTION METHOD OF SOYMILK CURD

BACKGROUND OF THE INVENTION

1. Field of the Invention

The present invention relates to a method for producing a soymilk curd using soymilk as an essential raw material having a mild texture suitable for desserts.

2. Description of the Related Art

Demands for soymilk have been increased with enhanced concern on health in recent years, and desserts such as soymilk pudding and soymilk yogurt using soymilk as an essential raw material have been developed in response to these increased demands of soymilk.

Production of gelled substances by cross-linking of proteins contained in foods has been disclosed in Japanese Patent Application Laid-Open (JP-A) No. 58-149645. Protein cross-linking enzymes have been reported to exist in nature including, for example, transglutaminase produced by microorganisms.

Transglutaminase has been used for the production of soybean curd. Examples of uses include prevention of deterioration of the texture by freezing in the production of frozen soybean curd disclosed in JP-A Nos. 06-217729, 06-269257 and 08-112071), improvements of the texture and flavor in the production of whole soybean curd containing okara (soybean curd refuse) disclosed in JP-A Nos. 11-299443 and 2000-139391, and prevention of decrease of soymilk gelling power by high temperature heat sterilization disclosed in JP-A Nos. 11-21039 and 2002-281928.

Transglutaminase has been practically used and sold by Ajinomoto Co., Ltd. with a trade name of Activa.

However, since the desserts using soymilk as an essential raw-material have heavy soybean curd-like texture as compared with desserts using cow milk and egg as essential raw materials, the market of the soymilk desserts has not been expanded as expected.

When the soymilk curd is prepared by mixing a coagulant such as calcium sulfate (a clarifying powder), magnesium chloride (brine) and glucono-δ-lactone that have been used for producing soybean curd, for producing the desserts using soymilk as the essential raw material, the dessert is liable to have a heavy texture of soybean curd.

Since the object of the art disclosed in the patents above is to maintain and improve the texture of usual soybean curd by taking advantage of the action of transglutaminase, they differ from the object of the art for changing the texture of soybean curd to pudding and bavarois-like mild textures.

SUMMARY OF THE INVENTION

It is an object of the present invention to provide a method for producing soymilk curd having pudding and bavarois-like mild textures while releasing small amount of water.

The present inventors have found, through intensive studies for producing soymilk curd having pudding and bavarois-like mild textures in the studied of coagulation methods of soymilk, that the soymilk curd having pudding and bavarois-like textures can be obtained by adjusting the pH of soymilk at 5.4 to 6.4 by adding an acid to the soymilk, and then adding a protein cross-linking enzyme to the pH adjusted soymilk, maintaining the temperature of enzyme added pH adjusted soymilk at 20 to 60° C. thereby cross-linking proteins contained in soymilk, and coagulating soymilk by maintaining the temperature at 70 to 90° C.

One aspect of the present invention provides a method for producing soymilk curd comprising steps of: adding a protein cross-linking enzyme into acid-treated soymilk adjusted at pH 5.4 to 6.4 by adding an acid to the soymilk; allowing proteins in the soymilk to form cross-links by maintaining the temperature at 20 to 60° C.; and allowing the cross-linked and acid-treated soymilk to coagulate by maintaining the temperature at 70 to 90° C.

Another aspect of the present invention provides a method for producing soymilk curd comprising steps of: adding a protein cross-linking enzyme and sugars into the acid-treated soymilk adjusted at pH 5.4 to 6.4 by adding an acid to the soymilk; allowing proteins in the soymilk to form cross-links by maintaining the temperature at 20 to 60° C.; and allowing the cross-linked and acid-treated soymilk to coagulate by maintaining the temperature at 70 to 90° C.

Preferably, 2 to 20 units of transglutaminase is added per 1 g of the soybean protein contained in soy milk as the protein cross-linking enzyme. Preferably, the acid is any one of wine vinegar, apple vinegar and Japanese plum brandy, or a mixture of two or more of them. Preferably, the sugar is any one of trehalose and multitose, or a mixture of trehalose and multitose.

DETAILED DESCRIPTION OF THE INVENTION

The present invention will be described in more detail hereinafter.

The present invention provides a method for producing soymilk curd having pudding and bavarois-like mild textures.

The pH is adjusted to 5.4 to 6.4 by adding an acid to soymilk in the present invention.

Any soymilk may be used in the present invention so long as it is called soymilk in usual sense. For example, while example thereof include one obtained by a step of removing okara (soybean curd refuse) by filtration or centrifugation after boiling immersed and crushed soybean for several minutes, whole soybean milk prepared by emulsifying with a high-pressure homogenizer without removing okara (soybean curd refuse) may be used. Soymilk preferably contains a solid content of soybean in a concentration in the range of 8 to 14% by weight.

An acid is added to soymilk in order to produce soymilk curd having a pudding-like texture that is different from the texture of soybean curd by a cross-linking treatment of soymilk by combining the acid with a below described protein cross-linking enzyme followed by coagulation of cross-linked soymilk.

Any acids capable of being used for foods may be added into soymilk, and examples of the acid include wine vinegar, apple vinegar, Japanese plum brandy, acetic acid, lactic acid, citric acid and glucuronic acid. However, any one of wine vinegar, apple vinegar and Japanese plum brandy, or a mixture of two or more of them is preferable. The flavor of the wine vinegar, apple vinegar or Japanese plum brandy is preferable for masking the odor of soybean and for improving the flavor of the product.

The pH is controlled in the range of 5.4 to 6.4 by adding the acid in soymilk because, when the pH of the acid-treated soymilk is less than 5.4, the soymilk curd obtained after the coagulation treatment becomes too hard, while coagulation of the soymilk curd obtained after the coagulation treatment is insufficient when the pH exceeds 6.4.

In the present invention, the protein cross-linking enzyme, or the protein cross-linking enzyme and sugars are added to acid-treated soymilk adjusted at pH 5.4 to 6.4, and the temperature is maintained at 20 to 60° C. for cross-linking the proteins contained.

Any protein cross-linking enzymes may be used for adding into acid-treated soymilk, so long as they are able to permit glutamine residues to form cross-links with lysine residues in protein contained in the soymilk. While examples of the enzyme include transglutaminase (abbreviated as TG hereinafter) derived from microorganisms, transglutaminase derived from mammals and transglutaminase derived from fishes. The transglutaminase derived from microorganisms is preferable among them since the enzyme does not require calcium for its reaction and is available at a low price.

The optimum pH of transglutaminase is within a neutral pH range, and the pH of soymilk is also near the neutral pH of 7.0. Accordingly, soymilk is usually cross-linked with transglutaminase without adjusting the pH. However, soymilk curd having pudding and bavarois-like textures that are different from the texture of usual soybean curd may be obtained by cross-linking at a slightly acidic pH range of 5.4 to 6.4 followed by coagulation of cross-linked soymilk.

The following examples show that pudding and bavarois-like soymilk curd is obtained by adjusting pH of soymilk at 5.4 to 6.4 by adding an acid, and by cross-linking with transglutaminase followed by coagulation.

Native soybean Enrei (1 kg) was immersed in water overnight, and 6 liters of water was added to immersed soybean followed by pulverization using a pulverizer of Nara type. The pulverized soybean was boiled at 100° C. for 3 minutes followed by removing the okara (soybean curd refuse) by filtration to obtain about 5 kg of soymilk with a soybean solid content of 10% by weight.

Dispensed in beakers was 100 g each of Soymilk obtained, and soymilk in the beaker was cross-linked by adding additives as shown in Table 1. Soymilk was coagulated thereafter by maintaining a temperature of 85° C. for 60 minutes to prepare soymilk curd A to J.

All soymilk curds A to F had a pH value of 6.9. Only the coagulant (magnesium chloride ($MgCl_2$) or glucono-δ-lactone (GDL)) usually used for soybean curd was added without applying any cross-linking treatment in soybean curds A and B. The coagulant (magnesium chloride ($MgCl_2$) or glucono-δ-lactone (GDL)), which are usually used for soybean curd, and transglutaminase (TG) were added to soymilk curds C and D. Only transglutaminase was added to soymilk curds E and F. The pH of soymilk was adjusted to 6.5 by adding an acid to soymilk in soymilk curd G. The pH of soymilk was adjusted to 6.0 that is the pH of the present invention by adding an acid to soymilk in soymilk curd H. The pH of soymilk was adjusted to 5.3 by adding an acid to soymilk in soymilk curd I. The pH of soymilk was adjusted to 5.9 that is the pH of the present invention by adding an acid to soymilk in soymilk curd J.

TABLE 1

| Soymilk Curd | Additive | | | | Cross-Linking pH Reaction |
|---|---|---|---|---|---|
| | $MgCl_2$ | GDL | TG | Acid | |
| A | 0.4 wt % | — | — | | 6.9 None |
| B | — | 0.3 wt % | — | | 6.9 None |
| C | 0.2 wt % | — | 1 wt % | — | 6.9 40° C., 30 Min. |
| D | — | 0.25 wt % | 1 wt % | — | 6.9 40° C., 30 Min. |
| E | — | — | 2 wt % | — | 6.9 40° C., 30 Min. |
| F | — | — | 5 wt % | — | 6.9 40° C., 30 Min. |
| G | — | — | 1 wt % | Wine Vinegar 0.5 wt % | 6.5 40° C., 30 Min. |
| H | — | — | 1 wt % | Wine Vinegar 1 wt % | 6.0 40° C., 30 Min. |
| I | — | — | 1 wt % | Wine Vinegar 3 wt % | 5.3 40° C., 30 Min. |
| J | — | — | 1 wt % | Acetic Acid 1 wt % | 5.9 40° C., 30 Min. |

The results of measurments of rheological values and organoleptic tests of soy milk curds A to J are shown in Table 2. A rheometer manufactured by Fudou Manufacturing Co., Ltd. was used for measuring the rheological values using a sample with a thikness of 2 cm, and a diameter of the plunger of 8 mm, with a clearance of 2 mm.

TABLE 2

| Soymilk Curd | Rheological Value | Organoleptic Evaluation |
|---|---|---|
| A | 46 | Texture of Soybean Curd |
| B | 42 | Texture of Soybean Curd |
| C | 51 | Texture of Hard Soybean Curd |
| D | 48 | Texture of Hard Soybean Curd |
| E | 15 | Insufficient Coagulation |
| F | 19 | Insufficient Coagulation |
| G | 26 | Too Soft |
| H | 30 | Pudding-like Texture |
| I | 42 | Hard but Pudding-like Texture |
| J | 31 | Pudding-like Texture |

The results in Table 2 show that pudding-like soymilk curd may be obtained by adjusting the pH at 5.4 to 6.4 by adding an acid to soymilk, and by cross-linking the acid-treated soymilk by adding transglutaminase followed by coagulation.

Since the rheological value of commercially available pudding and yogurt falls within the range of 28 to 35 when measured by the same method as in the test of the present invention, the rheological value of the soymilk curd dessert in the range of 28 to 35 obtained in the present invention seems to be appropriate.

Activa and Activa Super Curd (trade names; manufactured by Ajinomoto Co., Ltd.) derived from microorganisms are preferable as transglutaminase from the economical point of view.

While the amount of addition of the protein cross-linking enzyme into acid-treated soy milk is different depending on the duration of time for maintaining at 20 to 60° C., the preferable amount of addition is 2 to 20 units per 1 g of the soybean protein, contained in soymilk.

However, a time duration of 10 to 60 minutes is practically preferable for maintaining at 20 to 60° C. The amount of addition of the protein cross-linking enzyme is preferably 0.6 to 6% by weight (2 to 20 units per 1 g of the soybean protein contained in soymilk) when Activa Super Curd (trade name, manufactured by Ajinomoto Co., Ltd.; transglutaminase content 0.2% by weight, titer 20 units/g) is used.

Sugars are further added to the acid-treated soymilk in another aspect of the present invention, because addition of the sugars is effective for stabilizing the protein and improving flavor in the cross-linking process of the protein.

While any sugars may be used, so long as they have a function for stabilizing the protein, examples of them include trehalose, multitose, saccharose, maltose, glucose, fructose, sorbitol, glutinous starch syrup, reduced glutinous starch syrup, dextrin and soybean oligosaccharide, and preferable examples of them include either trehalose or multitose, or a mixture of trehalose and multitose. Since trehalose and multitose have a strong stabilizing action of proteins as well as protective action of proteins when soymilk is cross-linked at a slightly acidic pH of 5.4 to 6.4, released water of soymilk curd is reduced while flavor of the product is improved.

The sugars such as trehalose and multitose are preferably added in a proportion of 0.5 to 5% relative to the weight of soymilk.

After cross-linking of the protein, the acid-treated soymilk after the cross-linking process of the protein is coagulated by maintaining at a temperature of 70 to 90° C. in the present invention.

The duration of time for maintaining the temperature of 70 to 90° C. is preferably 20 to 90 minutes, because the adequate heating condition for allowing the acid-treated soymilk to complete coagulation after the cross-linking process while allowing transglutaminase to be deactivated is 20 to 90 minutes at 70 to 90° C.

According to the present invention, a dessert comparable to desserts prepared from cow milk and egg could be produced using soymilk as an essential raw material. Therefore, expansion of the market of soymilk related commodities that are favorable for health may be expected.

EXAMPLE

Example 1

Texture Test of Soymilk Curd Depending on pH of Soymilk

Native soybean Enrei (1 kg) was immersed in water overnight, and 6 liters of water was added to the immersed soybean, followed by pulverization using a pulverizer of Nara type. The pulverized soybean was boiled at 100° C. for 3 minutes followed by filtration with a cloth filter to obtain about 5 kg of soymilk with a soybean solid content of 10% by weight.

Dispensed in plastic vessels was 100 g each of Soymilk obtained, and pH of soymilk was adjusted to each value shown in Table 3 by adding a good amount of wine vinegar. Soymilk in each vessel was cross-linked by adding 5 units of Activa Super Curd (trade name, manufactured by Ajinomoto Co., Ltd.) per 1 g of the soybean protein contained in soymilk to seal each vessel, and by maintaining the sealed vessel in a water bath at 40° C. for 60 minutes.

Subsequently, coagulation of soymilk was completed by maintaining the vessel in hot water at 80° C. for 60 minutes to obtain soymilk curd 1 to 5 as examples of the present invention and soymilk curd R1 and R2 as comparative examples.

The results of measurements of rheological values and organoleptic tests of soymilk curd 1 to 5 and R1 and R2 are shown in Table 3. A rheometer manufactured by Fudou Manufacturing Co., Ltd. was used for measuring the rheological values in this example using a sample with a thickness of 2 cm, and a diameter of the plunger of 8 mm with a clearance of 2 mm.

TABLE 3

| Soymilk Curd | Wine Vinegar | pH | Rheological Value | Organoleptic Evaluation |
|---|---|---|---|---|
| R1 | 4 wt % | 5.3 | 42 | Sour and too hard |
| 1 | 3 wt % | 5.4 | 37 | Somewhat sour but pudding-like texture |
| 2 | 2 wt % | 5.6 | 33 | Good pudding-like texture |
| 3 | 1.5 wt % | 5.8 | 31 | Good pudding-like texture |
| 4 | 0.8 wt % | 6.2 | 29 | Good pudding-like texture |
| 5 | 0.5 wt % | 6.4 | 28 | Soft but good pudding-like texture |
| R2 | 0.3 wt % | 6.5 | 21 | insufficient coagulation |

Table 3 shows that soymilk curd having a good pudding-like texture may be obtained by adjusting the pH at 5.4 to 6.4 by adding an acid to soymilk, and by cross-linking the proteins to coagulate soymilk.

Example 2

Texture Test of Soymilk Curd Depending on the Amount of Addition of Protein Cross-Linking Enzyme Native soybean Enrei (1 kg) was immersed in water overnight, and 6 liters of water was added to the immersed soybean followed by pulverization using a pulverizer of Nara type. The pulverized soybean was boiled at 100° C. for 3 minutes followed by filtration with a cloth filter to obtain about 5 kg of soymilk with a soybean solid content of 10% by weight.

Dispensed in plastic vessels was 100 g each of soymilk obtained, and pH of soymilk was adjusted to 6.0 by adding 50 g of wine vinegar. Soymilk in each vessel was cross-linked by adding each unit of Activa Super Curd (trade name, manufactured by Ajinomoto Co., Ltd.) shown in Table 4 to seal each vessel, and by maintaining the sealed vessel in a water bath at 40° C. for 60 minutes.

Coagulation of soymilk was completed thereafter by maintaining the vessel in hot water at 80° C. for 60 minutes to obtain soymilk curds 6 to 12 as the examples of the present invention.

The results of measurements of rheological values and organoleptic tests of soybean curds 6 to 12 are shown in Table 4. A rheometer manufactured by Fudou Manufacturing Co., Ltd. was used for measuring the rheological values in this example using a sample with a thickness of 2 cm, and a diameter of the plunger of 8 mm with a clearance of 2 mm.

TABLE 4

| Soymilk Curd | Amount of Addition of TG (per 1 g of Soybean Protein) | Rheological Value | Organoleptic Evaluation |
|---|---|---|---|
| 6 | 1 unit | 24 | Soft as compared with pudding-like texture |
| 7 | 2 units | 28 | Soft but good pudding-like texture |
| 8 | 5 units | 29 | Good pudding-like texture |
| 9 | 10 units | 30 | Good pudding-like texture |

TABLE 4-continued

| Soymilk Curd | Amount of Addition of TG (per 1 g of Soybean Protein) | Rheological Value | Organoleptic Evaluation |
| --- | --- | --- | --- |
| 10 | 15 units | 32 | Good pudding-like texture |
| 11 | 20 units | 34 | A little hard but good pudding-like texture |
| 12 | 25 units | 36 | Hard as compared with pudding-like texture |

Table 4 shows that soymilk curd having good pudding-like texture may be obtained by adding the protein cross-linking enzyme at an amount of 2 to 20 units per 1 g of the soybean protein contained in soymilk for cross-linking soymilk.

When Activa Super Curd (trade name, manufactured by Ajinomoto Co., Ltd.) was added to the acid-treated soymilk in a proportion of 10 units per 1 g of the soybean protein contained in soymilk while 1 to 5% by weight of trehalose was added, the rheological value was 1 to 2 as high as that of the soymilk curd before adding trehalose to enable flavor of soymilk curd to be enhanced. Consequently, soymilk curd having a texture more resembling to pudding was obtained.

Example 3

Effect for Decreasing Released Water by Adding Sugars

Native soybean Enrei (1 kg) was immersed in water overnight, and 6 liters of water was added to the immersed soybean followed by pulverization using a pulverizer of Nara type. The pulverized soybean was boiled at 100° C. for 3 minutes followed by filtration with a filtration cloth to obtain about 5 kg of soymilk with a soybean solid content of 10% by weight.

Dispensed in plastic vessels was 100 g each of soymilk obtained, and pH of soymilk was adjusted to 5.8 by adding 75 g of wine vinegar to each vessel. Soymilk in each vessel was cross-linked by adding 5 unit of Activa Super Curd (trade name, manufactured by Ajinomoto Co., Ltd.) per 1 g of the soybean protein contained in soymilk and sugar in an each amount shown in Table 5 to seal each vessel, and by maintaining the sealed vessel in a water bath at 40° C. for 60 minutes.

Subsequently, coagulation of soymilk was completed by maintaining the vessel in hot water at 85° C. for 60 minutes to obtain soymilk curds 13 to 17 as the examples of the present invention.

The results of released water decreasing effect of soymilk curds in 13 to 17 shown in Table 5.

TABLE 5

| Soymilk Curd | Sugar | Volume of Released Water |
| --- | --- | --- |
| 13 | No | 3.4 ml |
| 14 | Trehalose 0.5 wt % | 2.8 ml |
| 15 | Trehalose 1 wt % | 2.0 ml |
| 16 | Trehalose 5 wt % | 1.6 ml |
| 17 | Multitose 2 wt % | 1.8 ml |

Table 5 shows that release of water may be effectively suppressed by cross-linking the acid-treated soymilk by adding the protein cross-linking enzyme as well as sugars such as trehalose and multitose.

Example 4

US soybean IOM (1 kg) was immersed in water overnight, and 5 liters of water was added to the immersed soybean followed by pulverization using a pulverizer of Nara type. The pulverized soybean was boiled at 100° C. for 3 minutes followed by emulsifying with a high-pressure homogenizer manufactured by Manton-Gaulin Co. to obtain about 4.2 kg of soymilk with a soybean solid content of 12% by weight.

The pH was adjusted to 5.9 by adding 65 g of Japanese plum brandy to soymilk obtained. After dissolving 80 g of Activa Super Curd (trade name, manufactured by Ajinomoto Co., Ltd.) and 80 g of trehalose in soymilk processed above, a 100 g portion of soymilk was filled in a cup with sealing, and soymilk was cross-linked by maintaining the cup in a water bath at 50° C. for 40 minutes.

Subsequently, coagulation was completed by maintaining the cup in hot water at 85° C. for 40 minutes to obtain soymilk curd as the example of the present invention.

Soymilk curd obtained had good flavor as a result of masking soybean curd odor with a mild pudding-like texture.

(Newly Added for US Style)

Although the present invention has been described with reference to the particular examples thereof, it should be understood that the present invention is not limited to those examples, and various changes and modifications may be made without departing from the spirit and scope of the present invention as defined in the appended claims.

What is claimed is:

1. A method for producing a soymilk curd having pudding- or bavarois-like textures comprising steps of: adding a protein cross-linking enzyme into acid-treated soymilk adjusted at pH 5.4 to 6.4 by adding an acid to the soymilk; allowing proteins in the soymilk to form cross-links by maintaining the temperature at 20 to 60° C.; and allowing the cross-linked and acid-treated soymilk to coagulate by maintaining the temperature at 70 to 90° C.

2. A method for producing a soymilk curd having pudding- or bavarois-like textures comprising steps of: adding a protein cross-linking enzyme and sugars into acid-treated soymilk adjusted at pH 5.4 to 6.4 by adding an acid to the soymilk; allowing proteins in the soymilk to form cross-links by maintaining the temperature at 20 to 60° C.; and allowing the cross-linked and acid-treated soymilk to coagulate by maintaining the temperature at 70 to 90° C.

3. A method for producing soymilk curd according to claim 1 comprising a step of adding 2 to 20 units of transglutaminase per 1 g of the soybean protein in the soymilk as the protein cross-linking enzyme.

4. A method for producing soymilk curd according to claim 2 comprising a step of adding 2 to 20 units of transglutaminase per 1 g of the soybean protein in the soymilk as the protein cross-linking enzyme.

5. A method for producing the soymilk curd according to claim 1, wherein the acid is any one of wine vinegar, apple vinegar or Japanese plum brandy, or a mixture of two or more of them.

6. A method for producing the soymilk curd according to claim 2, wherein the acid is any one of wine vinegar, apple vinegar or Japanese plum brandy, or a mixture of two or more of them.

7. A method for producing the soymilk curd according to claim 3, wherein the acid is any one of wine vinegar, apple vinegar or Japanese plum brandy, or a mixture of two or more of them.

8. A method for producing the soymilk curd according to claim 4, wherein the acid is any one of wine vinegar, apple vinegar or Japanese plum brandy, or a mixture of two or more of them.

9. A method for producing the soymilk curd according to claim 2, wherein the sugar is any one of trehalose or multitose, or a mixture of trehalose and multitose.

10. A method for producing the soymilk curd according to claim 4, wherein the sugar is any one of trehalose or multitose, or a mixture of trehalose and multitose.

11. A method for producing the soymilk curd according to claim 6, wherein the sugar is any one of trehalose or multitose, or a mixture of trehalose and multitose.

12. A method for producing the soymilk curd according to claim 8, wherein the sugar is any one of trehalose or multitose, or a mixture of trehalose and multitose.

* * * * *